United States Patent Office 3,281,348
Patented Oct. 25, 1966

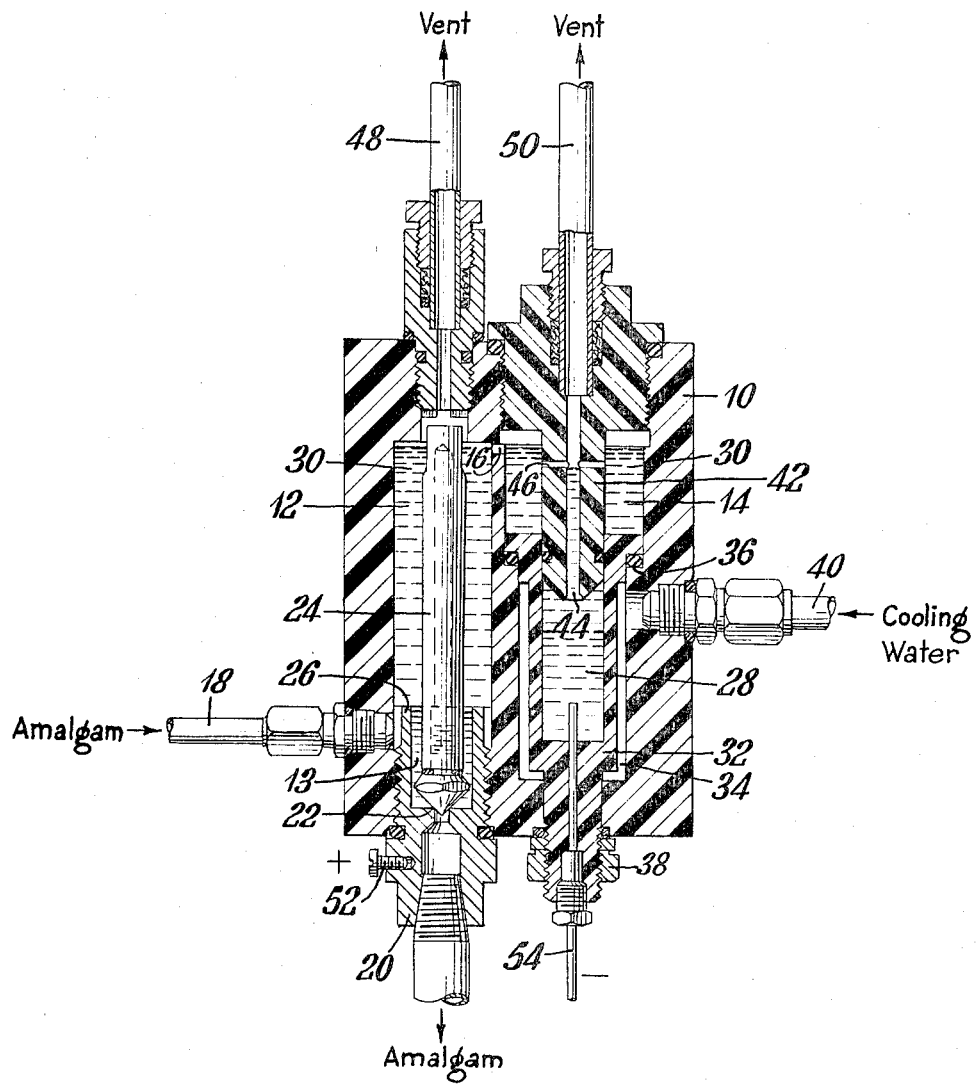

3,281,348
REFERENCE CELL FOR MONITORING A LIQUID STREAM
Erwin A. Schumacher, Cleveland, Lawrence J. Uline, Lakewood, and Milton B. Clark, North Royalton, Ohio, assignors to Union Carbide Corporation, a corporation of New York
Filed Dec. 23, 1963, Ser. No. 332,688
12 Claims. (Cl. 204—195)

The invention relates to a reference cell, and particularly refers to a reference cell capable of continuously monitoring a stream of liquid material.

In a sodium amalgam-oxygen fuel cell, sodium amalgam is continuously fed into the cell as a supply source of anodic sodium, and depleted amalgam (low in sodium content) is continuously removed from the cell. The depleted amalgam is then usually enriched with more sodium and recirculated as a supply source of anodic sodium. Since the concentration of sodium in the amalgam is critical due to the solidification at ordinary temperatures of the amalgam at certain sodium contents, a means by which the concentration of the sodium in the amalgam can be continuously regulated is needed.

The primary object of the invention, therefore, is to provide a reference cell which is able to continuously monitor the concentration of a liquid.

Another object is to provide a reference cell capable of continuously monitoring the concentration of sodium in a sodium amalgam.

Broadly, the above objects are achieved by a reference cell for monitoring a flowing liquid comprising a container having a first and a second chamber therein communicating with each other by a minute opening or small hole near the upper ends of each; a liquid inlet near the lower end of the first chamber and a liquid outlet having an orifice seat therein at the bottom of the first chamber, thereby permitting a flow of said liquid through the lower inside of said first chamber; and a float disposed in the first chamber in cooperative relationship with the orifice seat to maintain a desired amount of the liquid in the first chamber.

A reference electrode resides in the second chamber, and an electrolyte fills the remaining volume of the first and second chambers at least as high as the small hole between the chambers, thereby forming through the small hole an electrochemical bridge between the reference electrode and the liquid to be monitored. Preferably, the top of each chamber contains a vent to allow for fluctuations in the volume of the electrolyte or the liquid to be monitored and to provide means for blanketing the electrolyte and other materials with an inert gas. The reference cell also has electrical connections in separate electrical contact with the liquid and with the reference electrode.

In the drawing, a sectional view of a reference cell made in accordance with the invention is shown.

The reference cell there shown comprises a container 10 suitably made of a plastic or other material having a first chamber 12 and a second chamber 14 therein communicating with each other by means of a minute opening or small hole 16 near the upper ends of the chambers 12 and 14. A liquid inlet 18 enters the chamber 12 through a wall of the container 10 near the bottom of the chamber 12 and permits the entrance of a liquid 13 to be monitored into the chamber 12. At the bottom of the chamber 12, a liquid outlet 20 having an orifice seat 22 therein permits the exit of the liquid from the chamber 12. The outlet 20 and the seat 22 are suitably made of metal, but plastic and other materials are also suitable, if connection 52 is extended through the wall of outlet 20 to contact liquid 13.

A float 24 having a cone-shaped lower end, which end is preferably made of metal, is disposed in the first chamber 12 in cooperative relationship with the orifice seat 22. The density of this valve may be adjusted so that it will open at a certain height of the flowing liquid 13 in the chamber 12 and close at lower heights. Thus, a relatively constant volume of the liquid to be monitored is maintained in the reference cell.

A weir 26 is preferably disposed in the chamber 12 between the inlet 18 and the outlet 20 to provide a more uniform flow of the liquid 13 through the reference cell. In addition, the weir 26 causes the exposed surfaces of the volume of liquid 13 to be formed of the liquid most recently entering the reference cell, thus reducing the time lag between the time the concentration of liquid is recorded and the time the liquid enters the reference cell. As shown in the drawing, the weir 26 can be an integral part of the outlet 20, but it may also be a separate part or an integral part of the container 10. The weir 26 in most instances will be in the form of a cylinder extending into the chamber 12 from its bottom.

The chamber 14 contains a reference electrode 28 consisting of any suitable reference material electrically insulated from the liquid 13. An electrolyte 30 fills any remaining volume of the chambers 12 and 14 and communicates through the hole 16 between the two chambers 12 and 14, this hole providing electrolyte bridging means. The float 24 and the relatively constant volume of the liquid 13 in the chamber 12 prevents the electrolyte 30 from leaving the reference cell by way of the liquid outlet 20. Thus, the electrolyte 30 provides electrochemical contact between the liquid 13 to be monitored in the first chamber 12 and the reference electrode 28 in the second chamber 14. The small hole 16 minimizes contamination of the reference electrode 28 by the liquid 13. However, a preferred construction within the chamber 14 for preventing contamination and for providing a reference electrode with a constant temperature comprises the following:

An open-top reservoir 32 for holding the reference electrode 28 fits into the lower part of the chamber 14, but is generally spaced from the walls of the chamber 14 except at its upper and bottom portions to define a space 34 around the reservoir 32. As shown in the drawing, the reservoir 32 fits against a lip 36 formed in the wall of the chamber 14 about half way up the wall, and a nut 38, when screwed on the lower end of the reservoir 32, which extends through the bottom wall of the chamber 14, forces the reservoir 32 against the lip 36 and also seals the lower end of the reservoir 32 with the bottom of the chamber 14. Any desired temperature of the reference electrode 28 can be maintained, therefore, by introducing water or other heat exchange media into the space 34 around the reservoir 32 through a water inlet 40 and removing it through a water outlet (not shown).

To minimize contamination of the reference electrode 28, a tongue 42 having an axial passage 44 therein depends from the top of the chamber 14 and fits into the open top of the reservoir 32. At least one small orifice 46 connects the passage 44 with the electrolyte 30 in the chamber 14 to form an electrolyte bridge between the main body of electrolyte 30 and the electrolyte filling the passage 44 in the tongue 42. This orifice 46 along with the small hole 16 minimizes the chances of the liquid 13 to be monitored reaching the reference electrode 28. Other constructions which provide a small orifice between the main body of electrolyte 30 and the reference electrode 28 will be apparent to those in the art, but the one described is preferred since it is easily made and assembled. In addition, minutely porous members may be used instead of the small hole and orifice.

Vents 48 and 50 are preferably connected to the tops of the two chambers 12 and 14 in any suitable manner to allow for fluctuations in the volume of materials in the container 10 and to provide a means by which the electrolyte can be blanketed with an inert gas, if necessary or desirable. It will be manifest to those in the art that seal gaskets, such as those shown in the drawing, should be disposed in appropriate places in the reference cell construction to prevent undesirable leakage.

Electrical connections 52 and 54 are in electrical contact with the liquid 13 and the reference electrode 28 respectively. Since the liquid 13 and the reference electrode 28 form an electrochemical cell along with the electrolyte 30, the voltage between the liquid 13 and the reference electrode 28 can be recorded by a high impedance recorder connected to the electrical connections 52 and 54. Moreover, the voltage can be recorded continuously as the liquid 13 flows through the lower part of the first chamber 12. In addition, the high impedance recorder may be equipped with auxiliary features to regulate the concentration of the flowing liquid 13, for example, by adding an ingredient of the liquid 13 to raise its concentration.

A reference cell in accordance with the invention has been used successfully to monitor the concentration of sodium in sodium amalgam. An aqueous solution of sodium hydroxide was used as the electrolyte, and sodium amalgam of a known concentration was used as the reference electrode. The flow rate of the monitored sodium amalgam was about 15 to 20 cubic centimeters per minute with the usual voltage obtained ranging between 0 and 40 millivolts. The weight of the float valve was adjusted to open at the proper time by adding mercury to its hollow center.

Since the reference electrode must be electrically insulated from the liquid to be monitored, the container of the reference cell is preferably made of a nonconductive material, such as a plastic. It will be apparent, however, that other parts may be made of nonconductive material to accomplish the same purpose, but that the construction materials must not promote unduly the decomposition of the liquid to be monitored. It will also be apparent to those in the art that any electrolyte will be useful in the reference cell of the invention as long as it is electrochemically compatible with and immiscible with the two electrodes and has a density less than the liquid to be monitored.

The reference cell of the invention is also particularly suitable for monitoring the concentration of amalgams other than sodium amalgam, for example, amalgams of potassium, lead, calcium, magnesium, tin, zinc, cadmium, and the like.

What is claimed is:

1. A reference cell capable of continuously monitoring an electrically conductive flowing liquid, said cell comprising a container having first and second chambers therein communicating with each other solely through a minute opening near the upper ends of each; a liquid inlet near the lower end of said first chamber and a liquid outlet having an orifice seat therein at the bottom of said first chamber thereby permitting a flow of said liquid through the lower inside of said first chamber; a float disposed in said first chamber in cooperative relationship with said orifice seat to maintain a desired amount of said liquid in said first chamber; a reference electrode in said second chamber electrically insulated from said liquid; an electrolyte, compatible and immiscible with said liquid and said electrode and lighter in density than said liquid, filling the remaining portions of said first and second chambers at least as high as said opening and maintaining a bridge through said opening, thereby forming an electrochemical cell along with said liquid and said electrode; and electrical connection means associated with both said liquid and said electrode.

2. The reference cell defined in claim 1 wherein said first chamber contains a weir between said liquid inlet and said liquid outlet.

3. The reference cell defined in claim 2 wherein said weir consists of a cylindrical piece extending upwardly from the bottom of said first chamber.

4. The reference cell defined in claim 1 wherein said liquid is sodium amalgam, said electrolyte is an aqueous solution of sodium hydroxide, and said reference electrode is sodium amalgam of known concentration.

5. A reference cell capable of continuously monitoring an electrically conductive flowing liquid, said cell comprising a container having first and second chambers, therein communicating with each other solely through a minute opening near the upper ends of each; a liquid inlet near the lower end of said first chamber and a liquid outlet having an orifice seat therein at the bottom of said first chamber, thereby permitting a flow of said liquid through the lower inside of said first chamber; a float disposed in said first chamber in cooperative relationship with said orifice seat to maintain a desired amount of said liquid in said first chamber; a reservoir in said second chamber for holding a reference electrode, said reservoir being generally spaced from the walls of said second chamber but fitting against said wall at sufficient places to define a space between said reservoir and said walls, the interior of said reservoir communicating with said second chamber only through at least one small orifice; a reference electrode in said reservoir electrically insulated from said liquid; inlet and outlet means associated with said space for introducing a heat exchange medium into said space; an electrolyte, compatible and immiscible with said liquid and said electrode and lighter in density than said liquid, filling the remaining portons of said first and second chambers including said reservoir at least as high as said opening and maintaining a bridge through said opening and said orifice, thereby forming an electrochemical cell along with said liquid and said electrode; and electrical connection means associated with both said liquid and said electrode.

6. The reference cell defined in claim 5 wherein said first chamber contains a weir between said liquid inlet and said liquid outlet.

7. The reference cell defined in claim 6 wherein said weir consists of a cylindrical piece extending upwardly from the bottom of said first chamber.

8. The reference cell defined in claim 5 wherein said liquid is sodium amalgam, said electrolyte is an aqueous solution of sodium hydroxide, and said reference electrode is sodium amalgam of known concentration.

9. A reference cell capable of continuously monitoring an electrically conductive flowing liquid, said cell comprising a container having first and second chambers therein communicating with each other solely through a minute opening near the upper ends of each; a liquid inlet near the lower end of said first chamber and a liquid outlet having an orifice seat therein at the bottom of said first chamber, thereby permitting a flow of said liquid through the lower inside of said first chamber; a float disposed in said first chamber in cooperative relationship with said orifice seat to maintain a desired amount of said liquid in said first chamber, an open top reservoir in said second chamber generally spaced from the walls of said second chamber but fitting against said walls at the top of said reservoir, thereby defining a space between said reservoir and said walls; a reference electrode in said reservoir electrically insulated from said liquid; a tongue, having an axial passage therein and at least one radial orifice therein from said passage to its outside, extending from the top of said second chamber and fitting tightly into the open top of said reservoir; inlet and outlet means associated with said space for introducing a heat exchange medium into said space; an electrolyte, compatible and immiscible with said liquid and said electrode and lighter in density than said liquid, filling the remaining portions of said first and second chambers including said reservoir at least as high as said opening and maintaining a bridge through said opening, said orifice, and said passage, thereby forming an electrochemical cell along with said liquid and said electrode; and electrical connection means associated with both said liquid and said electrode.

10. The reference cell defined in claim 9 wherein said first chamber contains a weir between said liquid inlet and said liquid outlet.

11. The reference cell defined in claim 10 wherein said weir consists of a cylindrical piece extending upwardly from the bottom of said first chamber.

12. The reference cell defined in claim 9 wherein said liquid is sodium amalgam, said electrolyte is an aqueous solution of sodium hydroxide, and said reference electrode is sodium amalgam of known concentration.

References Cited by the Examiner

UNITED STATES PATENTS

| | | | |
|---|---|---|---|
| 2,370,871 | 3/1945 | Marks | 204—195 |
| 2,728,721 | 12/1955 | Ladisch et al. | 204—195 |
| 2,846,386 | 8/1958 | Ingruber | 204—195 |
| 3,031,385 | 4/1962 | Johnson et al. | 204—195 |
| 3,050,371 | 8/1962 | Dowson et al. | 204—195 |

JOHN H. MACK, *Primary Examiner.*

T. TUNG, *Assistant Examiner.*